W. J. RYAN.
EMERGENCY BRAKE.
APPLICATION FILED APR. 22, 1913.
1,100,623.
Patented June 16, 1914.
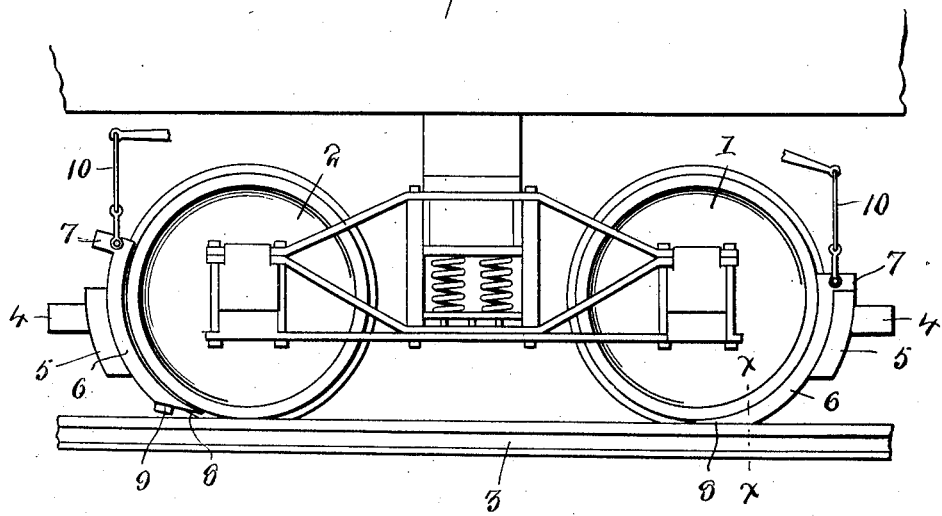
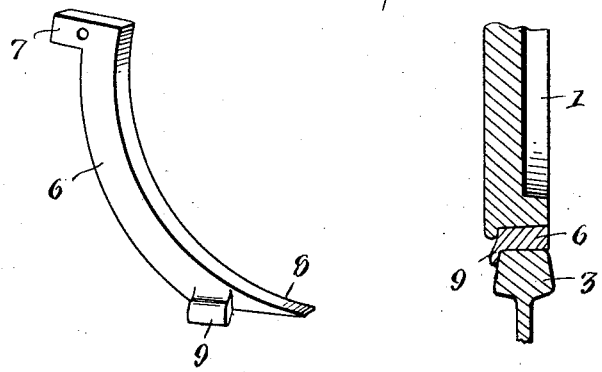

UNITED STATES PATENT OFFICE.

WILLIAM J. RYAN, OF SAPULPA, OKLAHOMA.

EMERGENCY-BRAKE.

1,100,623.

Specification of Letters Patent. Patented June 16, 1914.

Application filed April 22, 1913. Serial No. 762,819.

*To all whom it may concern:*

Be it known that I, WILLIAM J. RYAN, a citizen of the United States, residing at Sapulpa, in the county of Creek and State of Oklahoma, have invented new and useful Improvements in Emergency - Brakes, of which the following is a specification.

The invention provides a brake mechanism particularly adapted for railway cars, but which may be used in connection with vehicles generally to act automatically to prevent backward movement down grade in the event of the motive power being shut off.

A further purpose of the invention is the provision of a brake which will act effectively as a chock to bring the vehicle or rolling stock to rest without causing the same to skid or slide upon the wheels and produce flat places which in the event of railway cars is highly objectionable because of the noise and unpleasantness resulting from flat wheels.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a side view of a car truck provided with a brake mechanism embodying the invention, the brake at the right being shown in the position which it will assume in an emergency and the brake at the left illustrating the position of the brake for ordinary use. Fig. 2 is a detail view of the emergency brake. Fig. 3 is a section on the line $x$—$x$ of Fig. 1.

Corresponding and like parts are referred to in the following description, and indicated in all the views of the drawing, by the same reference characters.

Inasmuch as the invention is particularly designed for use upon railway cars it is shown applied to a car truck in the accompanying drawing. Such use, however, is not restricted as the invention may be generally applied.

The truck embodies two wheels 1 and 2. 3 represents a rail of the track upon which the truck is mounted.

The ordinary brake apparatus comprises beams 4 and shoes 5. The emergency brake consists of a shoe 6 which conforms to the circumference of the wheel and is adapted to be interposed between such wheel and the brake shoe 5. The shoe 6 is provided at its upper end with a head 7 which is adapted to overlap and engage with the upper end of the brake shoe 5 and thereby limit the downward movement of the emergency brake shoe when the same is applied as indicated at the right of Fig. 1. The lower end of the emergency brake shoe 6 is tapered, as indicated at 8, so as to come between the rail 3 and the lower side of the wheel and support the latter clear of the track when the brake shoe 6 is brought into service in an emergency. A flange 9 is provided at one side of the lower end of the emergency brake shoe to engage with a side of the rail 3 and prevent lateral displacement of the wheel when the same is elevated to a point to cause its flange to clear the rail. Any suitable means may be provided for operating the shoe 6, a connection 10 being shown. The part 10 may be coupled to any part of the air brake system or to any controlling part according to the nature of the vehicle or rolling stock to which the invention is applied. When the brake shoe 6 is adapted to be used in the same manner as the ordinary brake it is held elevated to bring its lower end clear of the rail as shown at the left of Fig. 1. However, when the brake shoe 6 is to be used in an emergency it is lowered, as indicated at the right of Fig. 1. In such emergency use of the invention the momentum of the vehicle causes the wheel to ride upon the lower portion of the brake shoe 6 and should the momentum be sufficient to cause the vehicle to slide or skid it moves upon the lower end of the brake shoe, thereby preventing the formation of any flat portion upon the edge of the wheel.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In brake mechanism of the character specified, a supplemental brake shoe to be interposed between the wheel and the usual brake shoe, such supplemental brake shoe curving throughout its length and having its lower end tapered and provided at one side with a flange to engage with the track to prevent lateral displacement of the wheel when the latter is elevated.

2. In brake mechanism of the character specified, a supplemental brake shoe to be interposed between the wheel and the usual brake shoe, such supplemental brake shoe curving throughout its length and having a head at its upper end and formed at its lower end with a tapered point and having a flange at one side of such point to engage with the track to prevent lateral displacement of the wheel when the latter is elevated.

In testimony whereof I affix my signature in presence of two witnesses.

WILLIAM J. RYAN.

Witnesses:
S. H. FAHEY,
W. A. TANKENLEY.

Copies of this patent may be obtained for five cents each, by addressing the "Commissioner of Patents, Washington, D. C."